United States Patent
Kang et al.

(10) Patent No.: US 7,557,955 B2
(45) Date of Patent: Jul. 7, 2009

(54) SYSTEM AND METHOD FOR MATCHING COLORIMETRIC ATTRIBUTES OF A PRODUCTION PRINT TO A PROOF

(75) Inventors: Sang-Chul Kang, Irvine, CA (US); Robert John Rolleston, Rochester, NY (US); Martin Sidney Maltz, Rochester, NY (US); Charles Michael Hains, Altadena, CA (US)

(73) Assignee: Xerox Corporation, Stamford, CT (US)

( * ) Notice: Subject to any disclaimer, the term of this patent is extended or adjusted under 35 U.S.C. 154(b) by 675 days.

(21) Appl. No.: 11/318,965

(22) Filed: Dec. 27, 2005

(65) Prior Publication Data
US 2007/0146744 A1    Jun. 28, 2007

(51) Int. Cl.
G06F 15/00    (2006.01)
(52) U.S. Cl. .................. 358/1.9; 358/2.1; 358/518; 358/3.23
(58) Field of Classification Search ........... 358/1.9, 358/518, 2.1, 3.23
See application file for complete search history.

(56) References Cited

U.S. PATENT DOCUMENTS

| | | | |
|---|---|---|---|
| 2001/0028471 A1* | 10/2001 | Hirokazu | 358/1.13 |
| 2002/0008880 A1* | 1/2002 | Dewitte et al. | 358/1.9 |
| 2002/0029715 A1* | 3/2002 | Ogatsu et al. | 101/494 |
| 2003/0090726 A1* | 5/2003 | Arai | 358/2.1 |
| 2006/0250629 A1* | 11/2006 | Morales et al. | 358/1.13 |

* cited by examiner

*Primary Examiner*—Twyler L. Haskins
*Assistant Examiner*—Michael Burleson
(74) *Attorney, Agent, or Firm*—Carter, DeLuca, Farrell & Schmidt, LLP

(57) ABSTRACT

A method and system are provided for producing a print that substantially corresponds to the colorimetric attributes of a corresponding proof for an electronic source file. The method and system entail creating a first raster file corresponding to the electronic source file and a second raster file corresponding to the proof. The first and second raster files are aligned to insure a spatial correlation, and a color conversion data structure is built by comparing the aligned first and second raster files. The color conversion data structure is then used to convert the first raster file to a color converted output file. The color converted output file is color transformed to an output file which is then used to produce the print. The print substantially corresponds to the colorimetric attributes of the corresponding proof for the electronic source file.

20 Claims, 3 Drawing Sheets

SYSTEM AND METHOD FOR MATCHING COLORIMETRIC ATTRIBUTES OF A PRODUCTION PRINT TO A PROOF

BACKGROUND

The present disclosure relates to printing systems, more specifically, to a system and method for matching colorimetric attributes of a production print to a proof.

Print buyers or document designers do not always have access to digital production printers, such as the XEROX DocuColor iGen3 Digital Production Press. As such, during the course of designing a document for subsequent printing using a production printer, the document designer creates proofs for visualizing how a final, production print will appear. These proofs are often created using any of a number of printers (DFE/IOT) more suitable for an office environment, such as a desktop inkjet device.

The created proofs generally set expectations for the designer or the print buyer as to the colorimetric attributes and final appearance of the production print. When the designer or print buyer likes a particular proof, an electronic application file corresponding to the particular proof is then submitted to a press or other facility having a production printer for producing a production print corresponding to the proof. Upon submission, the operator of the press is requested to "match" the proof, especially the colorimetric attributes of the proof, with the production print such that the production print substantially matches the proof. The colorimetric attributes refer to parameters and aspects which affect the color rendition of a print, such as brightness, contrast and hue.

Typically, an operator of a production printer has two options. One option is to explain to the designer or print buyer that the office or desktop printer that was used to create the proof produces prints which have different calorimetric attributes than the colorimetric attributes of prints produced by the production printer, and therefore, the colorimetric attributes of the print cannot be matched to the calorimetric attributes of the proof. The second option for the operator of the production printer is to use trial-and-error and attempt to set up the production printer with digital settings which would produce a production print which would more closely match the calorimetric attributes of the proof. This option requires the operator to spend time and effort to set up the production printer in an effort to closely match the calorimetric attributes of the proof.

The second option can be fruitless as there are typically physical limitations as to how close the color attributes can be matched. For example, the proof and the production print may have very different physical marking characteristics, e.g. inkjet versus toner, paper stock, and dye choices of colorants.

The operator of the production printer cannot usually make a "copy" of the proof, since the proof is likely to have lower IQ than what is available on the production printer (streaks, bands, error-diffusion dots, lower resolution, etc.), and may even be damaged (folded, scratched, etc.). There may also be document finishing options that are available in a "printer" mode, that are not available in a "copy" mode (e.g., signatures, imposition, slip sheets, tabs).

Additionally, even if the proof is not damaged, the operator of the production printer cannot simply scan the proof and use a visual display of the scanned proof in order to produce the production print. This is due to the different color spaces used by different devices. For example, the CMYK color space is the color space used for production printers and most color personal computer printers. The CMYK color space uses cyan, magenta, yellow and black inks on paper to absorb red, green and blue light. The remaining reflected light is the color perceived by the viewer. While the CMYK color space is the standard color space used by production printers, the Red-Green-Blue (RGB) color space is a personal computer's native color space.

Both RGB and CMYK color spaces are device-dependent color spaces; i.e., the colors rendered depend on the device that produces the colors. For example, the calorimetric attributes produced by a scanner vary from the colorimetric attributes visible on a monitor since a scanner uses a CCD (charge coupled device) array to capture colors, while a monitor produces colors from light-emitting phosphors. Additionally, the process of converting an image from the RGB color space to the CMYK color space generally compresses the colors into a smaller range.

The CMYK color space of one printer/device can vary significantly from the CMYK color space of another printer/device. Therefore, the CMYK color space of a first production printer can vary significantly from the CMYK color space of a second production printer. As such, ICC (International Color Consortium) profiles are frequently used to manage color between devices.

An ICC profile is a computer file that describes the color capabilities and the color space of a particular monitor, scanner, printer, printing press or color proofing device. ICC-based color management relies on two things: (1) device profiles, which characterize how individual devices produce color, and a color engine (also called a color matching module or CMM), which reads those profiles and translates and corrects colors between devices; and (2) LAB or XYZ colorimetric space, which arbitrates between color spaces of different devices. To simplify the discussion, we will only consider the LAB colorimetric space in the rest of this application. LAB colorimetric space is based on the way the human eye perceives color and is device independent. A LAB color engine translates RGB, CMYK and other color spaces to and from LAB; that is, a LAB color engine acts as an interpreter between different color spaces.

Most electronic documents to be printed or output on a particular device include multiple elements, such as text, photos, graphics and the like. Many electronic documents are a composite of other smaller documents and elements. For example, photos may be pasted into a large text document at different locations. Color graphics and monochrome images may occur on the same page of a document.

Accordingly, the individual elements of an electronic document that their colorimetric attributes are to be matched may be represented in a variety of color spaces; a situation which arises because the elements are derived from prior documents of differing origins. This situation may not be immediately apparent to the user, because the colors and other calorimetric attributes of the objects appear to match on the display or when printed using a straightforward color transformation process, such as is typical in ICC-based color management.

Based on the above background information, there exists a need for a reliable and non-time consuming system and method for matching the calorimetric attributes of a proof to a production print which overcome the drawbacks in the prior art and also provide added advantages over the prior art, such as being transparent to differing color spaces among different computing devices and among various individual elements of the proof.

SUMMARY

According to the present disclosure a method producing a print that substantially corresponds to the calorimetric attributes of a corresponding proof for an electronic source file. The method includes creating a first raster file corresponding to the electronic source file and creating a second raster file corresponding to the proof. The method further includes aligning the first and second raster files to insure a spatial correlation; building a color conversion data structure by comparing the aligned first and second raster files; and converting the first raster file to a color converted output file using the color conversion data structure. The method then provides for color transforming the color converted output file to an output file and printing the output file to produce the print.

According to the present disclosure, a system for producing a print that substantially corresponds to the calorimetric attributes of a corresponding proof for an electronic source file includes a first computing device for creating a first raster file corresponding to the electronic source file, and a second computing device for creating a second raster file corresponding to the proof. The system further includes at least one processor capable of executing application software for aligning the first and second raster files to insure a spatial correlation; building a color conversion data structure by comparing the aligned first and second raster files; converting the first raster file to a color converted output file using the color conversion data structure; and color transforming the color converted output file to an output file. The system also includes a printer for printing the output file to produce the print.

The present disclosure also provides a method for generating an output file capable of producing a print that substantially corresponds to the colorimetric attributes of a proof for a given electronic source file. The method includes creating a first raster file corresponding to the electronic source file and creating a second raster file corresponding to the proof. The method further includes aligning the first and second raster file to insure spatial correlation, and building a color conversion data structure using data obtained from the spatial correlation. The method then uses the color conversion data structure to convert the first raster file to a color converted output file. The method then color transforms the color converted output file to generate the output file capable of producing the print.

Further, according to the present disclosure there is provided a system for generating an output file capable of producing a print that substantially corresponds to the colorimetric attributes of a proof for a given electronic source file. The system includes a first computing device for creating a first raster file corresponding to the electronic source file and a second computing device for creating a second raster file corresponding to the proof. The system further includes at least one processor for receiving the first and second raster files and capable of executing application software for generating the output file using at least the first and second raster files and color-related information corresponding to the electronic source file.

The present disclosure also provides a computer-readable storage medium storing a set of programmable instructions capable of being executed by at least one processor for producing an output file using as inputs a first raster file and a second raster file. The first raster file corresponds to an electronic source file and the second raster file corresponds to a proof. The set of programmable instructions being executed by the at least one processor for producing the output file by aligning the first and second raster files to insure a spatial correlation; building a color conversion data structure by comparing the aligned first and second raster files; converting the first raster file to a color converted output file using the color conversion data structure; and color transforming the color converted output file to produce the output file.

BRIEF DESCRIPTION OF THE DRAWINGS

Various embodiments of the present disclosure will be described herein below with reference to the figures wherein.

DETAILED DESCRIPTION

Embodiments of the present disclosure will be described herein below with reference to the accompanying drawings. In the following description, well-known functions or constructions are not described in detail to avoid obscuring the present disclosure in unnecessary detail.

The word "printer" and term "printing system" as used herein encompasses any apparatus and/or system, such as a digital copier, xerographic and reprographic printing systems, bookmaking machine, facsimile machine, multi-function machine, etc. which performs a print outputting function for any purpose.

Figure 1:
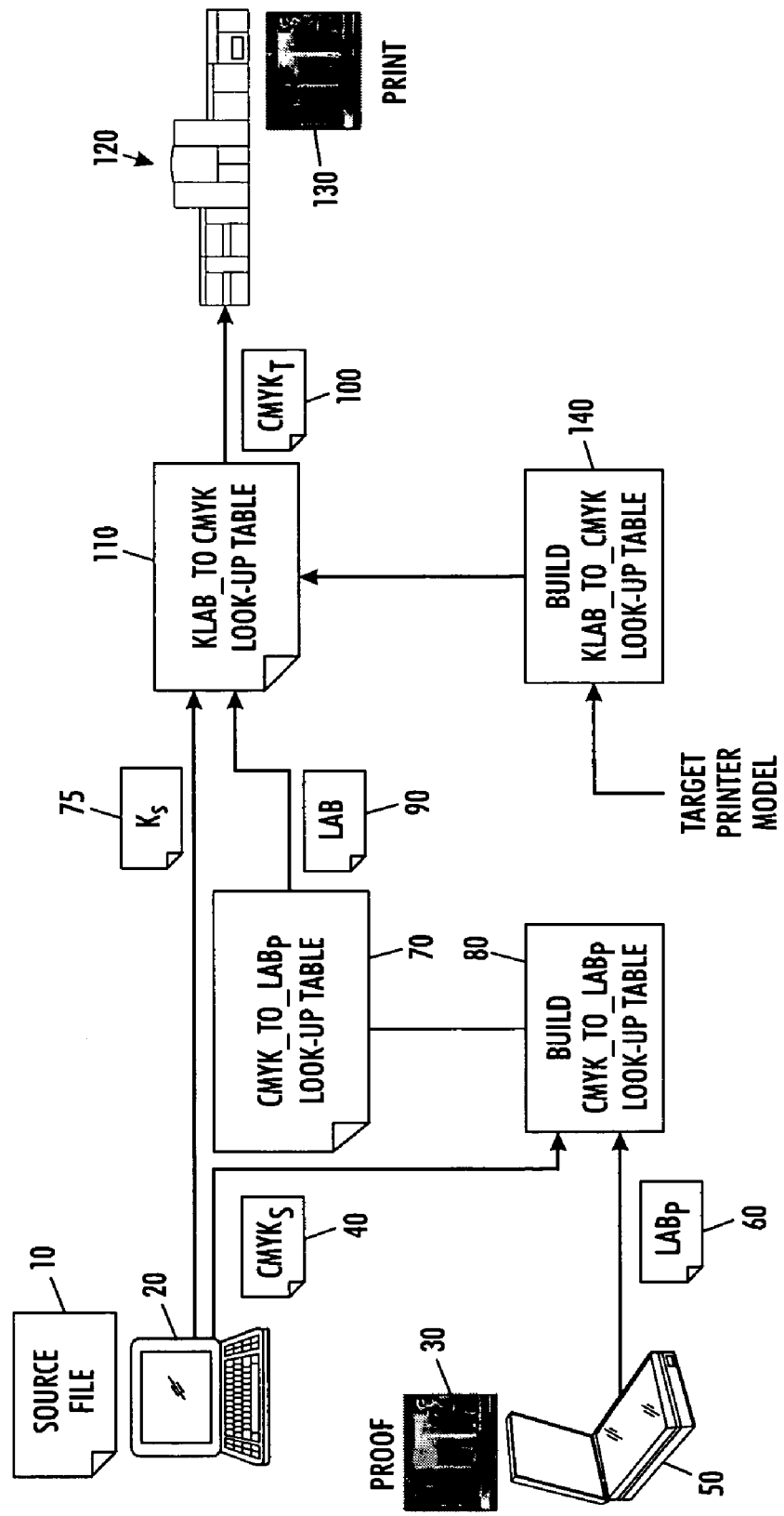
FIG. 1 is a schematic diagram of a printing system in accordance with the present disclosure.
Figure 2:
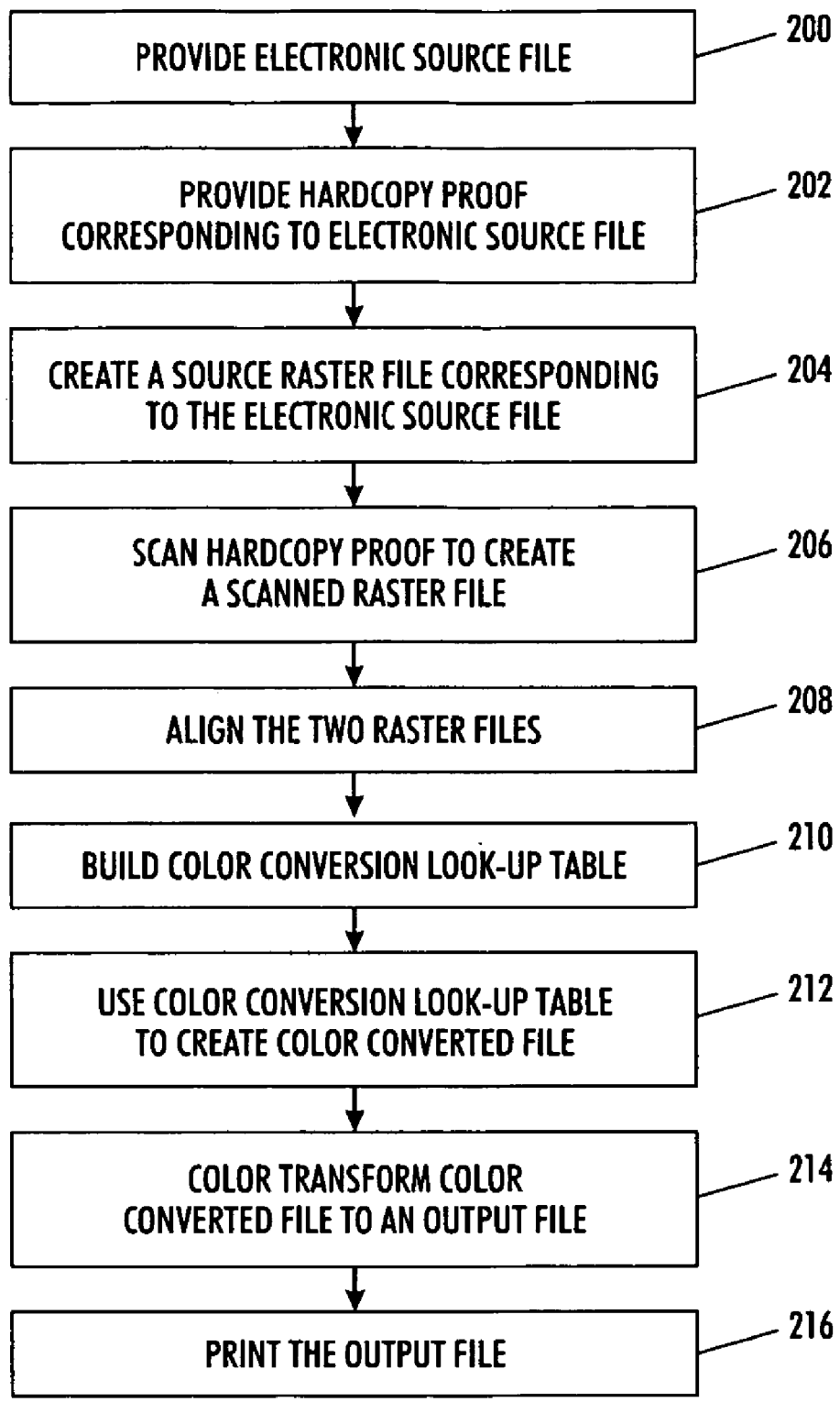
FIG. 2 is a flow chart illustrating a method for matching the calorimetric attributes of a proof to a production print in accordance with the present disclosure.

Referring now to FIGS. 1 and 2, there are shown respectively a schematic diagram of an exemplary printing system and a method in accordance with the present disclosure. The exemplary system and method of the present disclosure will now be described in detail with reference to these figures. The system of the present disclosure designated generally by reference numeral 1 includes at least one processor for performing the functions and steps described herein for the method according to the present disclosure.

Figure 3:
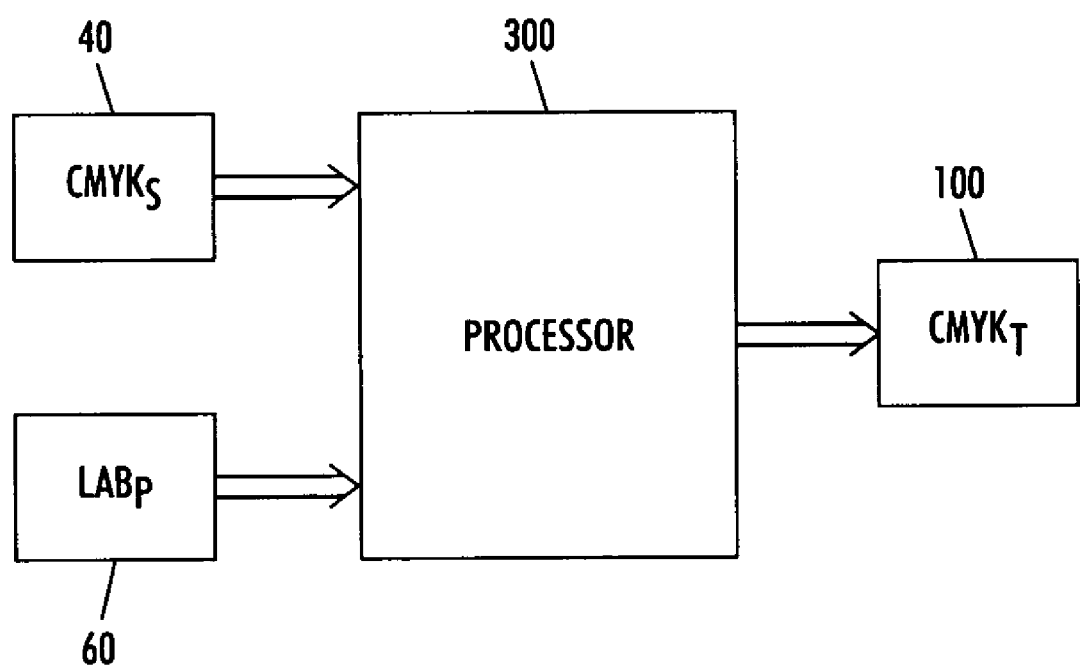
FIG. 3 is a block diagram of at least one processor of the system in accordance with the present disclosure.

The at least one processor as shown by FIG. 3 receives input files and executes application software having a series of programmable instructions for performing the functions of the system and method according to the present disclosure. The application software can be stored on a computer-readable medium, such as a CD-ROM, DVD, hard drive, and diskette.

With reference to FIG. 1, an electronic source file 10 is provided to the printing system 1 which may be stored within a personal computer 20 or other computing device (Step 200). A hardcopy proof 30 corresponding to the electronic source file 10 is also provided and is indicative of the calorimetric attributes of a desired production print for the proof 30 (Step 202).

The electronic source file 10 is raster-image processed or ripped by a raster-image processor (RIP) (e.g., a processor executing raster image processing software) to create a source raster file 40 (Step 204). The source raster file 40 has source rasters, where each source raster represents a portion of the electronic source file. The source raster file 40 as shown in FIG. 1 is a Cyan-Magenta-Yellow-Black (CMYK) color space raster file ($CMYK_S$), e.g., Standard Web Offset Press (SWOP) CMYK color space. However, in accordance with the present disclosure the raster file can be a raster file of any color space.

Hardcopy proof 30 is scanned using a computing device, such as a calorimetrically characterized scanner 50, to create a scanned raster file or digital file 60($LAB_P$), if one is not already available (Step 206). The scanned raster file 60 has scanned rasters, where each scanned raster represents a portion of the proof 30. The characterized scanner 50 captures the scanned digital file 60 in a calorimetric space, such as CIELAB. It is contemplated that the scanner characterization is made using the same media and imaging technology used to create the proof 30. It is further contemplated that a characterized digital camera could be used in lieu of scanner 50, if warping and rectifying software are used by the at least one processor.

The source raster file 40 and the scanned raster file 60 are then sent to the at least one processor 300 as input files (see FIG. 3). The at least one processor 300 can be resident within a remote or local server where the two raster files 40, 60 are received via a network connection. It is envisioned that one can send to the at least one processor 300 the electronic source file 10 and an electronic version of the scanned proof, instead of the hardcopy proof 30, as long as the proof file is in a calorimetric space.

The at least one processor 300 executes application software for aligning the two raster files 40, 60 using well known algorithms to insure a spatial correlation between the pixels of the two raster files 40, 60 (Step 208). The spatial correlation is obtained by substantially aligning the scanned rasters of the scanned raster file 60 with the source rasters of the source raster file 40. This entails for the at least one processor 300 to determine a polynomial warping function that transforms the scanned rasters such that they align with the corresponding source rasters. The polynomial warping function is determined using well known algorithms.

Once substantially aligned, look-up table builder 80 uses the colors of the corresponding pixels of the source rasters and the scanned rasters to build a color conversion look-up table (LUT) 70 (CMYK_TO_$LAB_P$ LUT) or color conversion data structure (Step 210). The process of correlating the two images corresponding to raster files 40 and 60 and building the color conversion look-up table 70 is an automated process performed by the at least one processor 300 executing the application software.

The color conversion look-up table 70 is built by the at least one processor 300 executing application software and comparing the non-colorimetric values (the C, M, Y, K values in the $CMYK_S$ source raster file 40) with the calorimetric values (the corresponding L*, A*, B* values in the $LAB_P$ scanned raster or digital file 60). The color conversion look-up table 70 is a multi-dimensional (e.g., 4 to 3) look-up table that is used to color convert the $CMYK_S$ input corresponding to the source rasters into a LAB color converted output file 90 as further described below.

It is contemplated that multiple profiles can be built for different objects in the source file 10. This provides better calorimetric attribute matching between the source file 10 and the proof 30 compared to using a single global profile, if the objects of the source file 10 have very different calorimetric characteristics.

The color correction profile 70 is used for color conversion in order to create a color converted file; for example, it is used to color convert the CMYK raster file 40 to the LAB color converted output file 90 (Step 212). The converted LAB color converted output file 90 is the colorimetric version of the original electronic source file 10. LAB color converted output file 90 is then color transformed to an output file ($CMYK_T$) 100 using a K- (or black) preserving look-up table (KLAB_TO_CMYK LUT) 110 (Step 214).

The K component of the $CMYK_S$ source raster file 40 is also fed to the K-preserving look-up table 110 for K-preservation. The K-preserving look-up table 110 preserves the input K information in the output K' which may be lost during a series of mappings through the device independent calorimetric space, e.g., $CMYK_S$ 40→LAB 90→$CMYK_T$ 100. The color transformation process that can be used by the method and system of the present disclosure in transforming LAB 90 to $CMYK_T$ 100 is described by Zeng, Huanzhao in "CMYK transformation with black preservation in color management system," Proc. SPIE, vol. 4663, pp. 143-149, Color Imaging: Device-Independent Color, Color Hardcopy, and Applications VII, Reiner Eschbach; Gabriel G. Marcu, eds., SPIE, December 2001; the entire contents of which are incorporated herein by reference. In addition, other K preservation techniques, well known to those skilled in the art, may be used.

Look up table builder 140 makes the K-preserving look up table 110 from the printer model for the target printer 120. Therefore this table does not have to be rebuilt for each input job, and is only rebuilt when the state of the target printer changes. To make this table, the look up table builder 140 calculates an output CMYK for input L*, A*, B*, and K values arranged on a four-dimensional grid. For each input L*A*B* value it tries to find an output CMYK value which, if printed on the target printer, would make a color with the input L*A*B* value. It also tries to make the input and output K values equal.

This is not always possible for two reasons. First of all, the target printer may not be able to print a color with the input L*A*B* value for any combination of CMYK. In this case, the look up table builder chooses a color with a L*A*B* value the printer can make. This operation is generally called gamut mapping, and is well known to those skilled in the art. Secondly, the printer may not be able to make the color with the input or gamut mapped L*A*B* value when the output K value is equal to the input K value. In this case, the output K value is either increased or decreased until an output CMYK value that can produce the color with the desired L*A*B* value is found.

The output file 100 may then be printed on a target production printer 120 to produce the production print 130 (Step 216). The production print 130 has colorimetric attributes which substantially match the calorimetric attributes of the proof 30. Therefore, for the K-preservation case, the output file 100 produced from look-up table 110 is then sent to the production printer 120. For the non K-preservation case, the calorimetric version of the electronic source file 10 may be printed by sending it directly to the target printer 120.

The color calibration process includes converting the input CMYK color space into a device-independent color space (e.g. CIE CAM97s Jab, CIELAB or MLAB), gamut mapping, and converting the in-gamut device-independent color space into the output CMYK color space. The input K information may be carried to the second and third steps to determine the amount of the output K'. Therefore, the input K information is not lost during the color transformation in accordance with the present disclosure.

The choice of colorimetric space associated with the present disclosure is not limited to LAB. LAB uses three values to describe the precise three-dimensional location of a color inside a visible colorimetric space. The most widely used calorimetric spaces are sRGB for scanners and displays, SWOP CMYK for color printing and YUV for video and TV. Prior to the proliferation of electronic displays, calorimetric spaces were developed that were closer to the way people perceive color. For example, the HSB model uses hue, saturation and brightness, while the LAB model uses lightness (L) and values on red-green and blue-yellow axes. Other color spaces may include, but are not limited to YCC, CIELUV, CIE CAM97s Jab, or MLab.

The system and method of the present disclosure has been performed, tested and analyzed. The electronic source files used in the test cases were PostScript, PDF and Tiff but it is envisioned that various other files could be used as well. The customer proofs were printed on a digital production press. A digital press for commercial, in-plant and quick print printing was used as the production printer 120.

A proof including eight color patches was printed representing the color attributes that a print buyer desired. However, the proof contained bands that the customer wanted to have removed. The source file, in this case, a Tiff file, was printed on the production printer. This produced a print having a tone level, tone scale, and color patches far different from those of the original proof.

Using the system and method of the present disclosure a new print was created which resulted in a much closer tonal match and in other colorimetric attributes to the proof. The bands that were present in the original were removed and a higher image quality was achieved. The eight color patches on the page were measured and deltaE's were computed using the CIE94 Error metric with white relative to paper. The average deltaE between the proof and the source file for the prior art method was 9.3. The average deltaE between the proof and the source file according to the method of the present disclosure was 4.7.

Prior methods for matching calorimetric attributes of a production print to a proof involve finding large color areas in the source file and corresponding colorimetric values of the proof. This data was then used to make a simple smooth transform. The method and system of the present disclosure use all of the data with the exception of edge information in order to produce a detailed profile that concentrates on the specific colors used in the proof. Therefore, prior methods use a smooth transform to move the global image in the right direction on the average, while the method and system of the present disclosure use a characterized scanner to determine LAB calorimetric values and then create a more exact color profile to match a production print to a proof. The result is that all of the actual colors that are used in the source file are used in the new profile rather than a simple smoothing determined from a few selected colors in the source file. Additionally, the method and system according to the present disclosure are transparent to differing calorimetric spaces among different computing devices and among various individual elements of the proof.

Variations of the present disclosure are envisioned in order to improve print quality. For instance, multiple iterations of the present disclosure could provide an increased print quality. The final print 130 may be re-scanned and the method and system of the present disclosure executed again in order to perform a fine adjustment. Moreover, multiple color correction profiles may be built for different objects of the source file 10. This may provide better matches compared to using a single global profile if the objects have different characteristics. The teachings of the present disclosure can also be used to compensate for a change in printer response, and for software and color rendering updates.

It will be appreciated that variations of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

The invention claimed is:

1. A method for producing a print that substantially corresponds to the colorimetric attributes of a corresponding proof for an electronic source file, the method comprising:
   creating a first raster file corresponding to the electronic source file and to a first color space;
   creating a second raster file corresponding to the proof and to a second color space;
   aligning the first and second raster files to insure a spatial correlation;
   building a color conversion data structure by comparing the aligned first and second raster files respectively corresponding to the first and second color spaces;
   converting the first raster file to a color converted output file using the color conversion data structure;
   color transforming the color converted output file to an output file; and
   printing the output file to produce the print, wherein the first and second color spaces are different color spaces.

2. The method according to claim 1, wherein the first raster file has non-colorimetric values and the second raster file has colorimetric values, and wherein building a color conversion data structure includes comparing corresponding non-colorimetric values of the first raster file to colorimetric values of the second raster file.

3. The method according to claim 1, wherein creating the second raster file includes at least one of scanning the proof by a colorimetrically characterized scanner and using a characterized digital camera.

4. The method according to claim 1, wherein color transforming includes utilizing a K-preserving look-up table built by using at least one of K-preserving information corresponding to the electronic source file and information relating to a printer.

5. The method according to claim 1, wherein the color conversion data structure is a look-up table.

6. A system for producing a print that substantially corresponds to the colorimetric attributes of a corresponding proof for an electronic source file, the system comprising:
   a first computing device for creating a first raster file corresponding to the electronic source file and to a first color space;
   a second computing device for creating a second raster file corresponding to the proof and to a second color space;
   at least one processor capable of executing application software for aligning the first and second raster files to insure a spatial correlation; building a color conversion data structure by comparing the aligned first and second raster files respectively corresponding to the first and second color spaces; converting the first raster file to a color converted output file using the color conversion data structure; and color transforming the color converted output file to an output file; and
   a printer for printing the output file to produce the print, wherein the first and second color spaces are different color spaces.

7. The system according to claim 6, wherein the first raster file has non-colorimetric values and the second raster file has colorimetric values, and wherein the at least one processor executes application software for building the color conversion data structure includes comparing corresponding non-colorimetric values of the first raster file to colorimetric values of the second raster file.

8. The system according to claim 6, wherein the second computing device is one of a colorimetrically characterized scanner and a characterized digital camera.

9. The system according to claim 6, wherein the at least one processor executes application software for color transforming includes utilizing a K-preserving look-up table built by using at least one of K-preserving information corresponding to the electronic source file and information relating to a printer.

10. A method for generating an output file capable of producing a print that substantially corresponds to the colorimetric attributes of a proof for a given electronic source file, the method comprising:

creating a first raster file corresponding to the electronic source file and to a first color space;

creating a second raster file corresponding to the proof and to a second color space;

aligning the first and second raster files to insure spatial correlation;

building a color conversion data structure using data obtained from the spatial correlation of the first and second raster files respectively corresponding to the first and second color spaces;

using the color conversion data structure to convert the first raster file to a color converted output file; and color transforming the color converted output file to generate the output file capable of producing the print, wherein the first and second color spaces are different color spaces, and wherein the first raster file has non-colorimetric values and the second raster file has colorimetric values, and wherein building a color conversion data structure includes comparing corresponding non-colorimetric values of the first raster file to colorimetric values of the second raster file.

11. The method according to claim 10, wherein creating the second raster file includes at least one of scanning the proof by a colorimetrically characterized scanner and using a characterized digital camera.

12. The method according to claim 10, wherein color transforming includes utilizing a K-preserving look-up table built by using at least one of K-preserving information corresponding to the electronic source file and information relating to a printer.

13. The method according to claim 10, wherein the color conversion data structure is a look-up table.

14. A system for generating an output file capable of producing a print that substantially corresponds to the colorimetric attributes of a proof for a given electronic source file, the system comprising:

a first computing device for creating a first raster file corresponding to the electronic source file and to a first color space;

a second computing device for creating a second raster file corresponding to the proof and to a second color space; and at least one processor for receiving the first and second raster files and capable of executing application software for generating the output file using at least the first and second raster files respectively corresponding to the first and second color spaces and color-related information corresponding to the electronic source file, including using a color conversion data structure built by comparing the first and second aligned raster files, wherein the first and second color spaces are different color spaces.

15. The system according to claim 14, wherein the at least one processor generates the output file by aligning the first and second raster file to insure spatial correlation; building a color conversion data structure using data obtained from the spatial correlation; using the color conversion data structure to convert the first raster file to a color converted output file; and color transforming the color converted output file to generate the output file.

16. The system according to claim 15, wherein the first raster file has non-colorimetric values and the second raster file has colorimetric values, and wherein the at least one processor building a color conversion data structure includes executing the application software for comparing corresponding non-colorimetric values of the first raster file to colorimetric values of the second raster file.

17. The system according to claim 14, wherein the second computing device is a colorimetrically characterized scanner.

18. A computer-readable storage medium storing a set of programmable instructions capable of being executed by at least one processor for producing an output file using as inputs a first raster file and a second raster file, wherein the first raster file corresponds to an electronic source file and to a first color space, and the second raster file corresponds to a proof and to a second color space, the set of programmable instructions being executed by the at least one processor for producing the output file by:

aligning the first and second raster files to insure a spatial correlation;

building a color conversion data structure by comparing the aligned first and second raster files respectively corresponding to the first and second color spaces;

converting the first raster file to a color converted output file using the color conversion data structure; and color transforming the color converted output file to produce the output file, wherein the first and second color spaces are different color spaces.

19. The computer-readable storage medium according to claim 18, wherein the first raster file has non-colorimetric values and the second raster file has colorimetric values, and wherein building the color conversion data structure includes comparing corresponding non-colorimetric values of the first raster file to colorimetric values of the second raster file.

20. The computer-readable storage medium according to claim 19, wherein color transforming includes utilizing a K-preserving look-up table built by using at least one of K-preserving information corresponding to the electronic source file and information relating to a printer.

* * * * *